United States Patent
Wisnovsky et al.

(10) Patent No.: US 11,256,430 B2
(45) Date of Patent: *Feb. 22, 2022

(54) CRITERIA-BASED COST-EFFICIENT ROUTING AND DEPLOYMENT OF METADATA PACKAGES IN AN ON-DEMAND ENVIRONMENT

(71) Applicant: salesforce.com, inc., San Francisco, CA (US)

(72) Inventors: Peter S. Wisnovsky, Oakland, CA (US); Scott Musser, Longmont, CO (US); Zhijie Guan, Bellevue, WA (US); Carl Watterson Montgomery, Salt Lake City, UT (US)

(73) Assignee: salesforce.com, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/068,745

(22) Filed: Oct. 12, 2020

(65) Prior Publication Data
US 2021/0109669 A1    Apr. 15, 2021

Related U.S. Application Data

(63) Continuation of application No. 15/729,962, filed on Oct. 11, 2017, now Pat. No. 10,802,738.

(51) Int. Cl.
*G06F 12/00* (2006.01)
*G06F 3/06* (2006.01)
(Continued)

(52) U.S. Cl.
CPC ........ *G06F 3/0635* (2013.01); *G06F 16/1827* (2019.01); *H04L 67/06* (2013.01); *H04N 21/20* (2013.01); *G06F 3/067* (2013.01)

(58) Field of Classification Search
CPC .................................................... G06F 3/0635
See application file for complete search history.

(56) References Cited

U.S. PATENT DOCUMENTS 5,577,188 A    11/1996  Zhu
5,608,872 A     3/1997  Schwartz et al.
(Continued)

OTHER PUBLICATIONS

Final Office Action for U.S. Appl. No. 15/729,962 dated Dec. 2, 2019, 10 pages.
(Continued)

*Primary Examiner* — Jason W Blust
(74) *Attorney, Agent, or Firm* — Kwan & Olynick LLP

(57) ABSTRACT

In accordance with embodiments, there are provided mechanisms and methods for facilitating criteria-based cost-efficient routing and deployment of metadata packages in an on-demand services environment according to one embodiment. In one embodiment and by way of example, a method comprises analyzing, by a metadata costing server computing device, characteristics of a metadata package awaiting deployment, where analyzing includes matching the characteristics with predefined criteria associated with deployment of metadata packages. The method may further include routing, by the metadata server, the metadata package for real-time deployment if the characteristics satisfy the criteria, where the real-time deployment allows for bypassing of message queues associated with standard deployment.

12 Claims, 7 Drawing Sheets

(51) Int. Cl.
*H04L 29/08* (2006.01)
*H04N 21/20* (2011.01)
*G06F 16/182* (2019.01)

(56) References Cited

U.S. PATENT DOCUMENTS

| | | | |
|---|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,460,476 B1 | 12/2008 | Morris et al. |
| 7,620,655 B2 | 11/2009 | Larsson et al. |
| 7,633,869 B1 | 12/2009 | Morris et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |

OTHER PUBLICATIONS

Non-Final Office Action for U.S. Appl. No. 15/729,962 dated Jun. 14, 2019, 9 pages.

Notice of Allowance for U.S. Appl. No. 15/729,962 dated Jun. 18, 2020, 8 pages.

ers of database systems. Unfortunately, conventional database approaches are associated with various limitations.

CRITERIA-BASED COST-EFFICIENT ROUTING AND DEPLOYMENT OF METADATA PACKAGES IN AN ON-DEMAND ENVIRONMENT

CLAIM OF PRIORITY

This application is a continuation of, and claims the benefit of, U.S. patent application Ser. No. 15/729,962 entitled "CRITERIA-BASED COST-EFFICIENT ROUTING AND DEPLOYMENT OF METADATA PACKAGES IN AN ON-DEMAND ENVIRONMENT," filed Oct. 11, 2017, now U.S. Pat. No. 10,802,738 with an issue date of Oct. 13, 2020, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management; more specifically, to facilitating criteria-based cost-efficient routing and deployment of metadata packages in an on-demand services environment.

BACKGROUND

One of the problems in working with large systems is contention for resources required to process specific types of work. Conventional web system deployment techniques require automatically adding deployment requests to message queuing systems that are then subsequently dequeued and deployed through a deployment system. Such conventional techniques lead to delays while waiting for messages to be processed. For example, delays may occur if a system is under-load or a particular message type being used by the queue is backed up or relegated to a processing tier that is resource-constrained.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of admin-

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Figure 1:
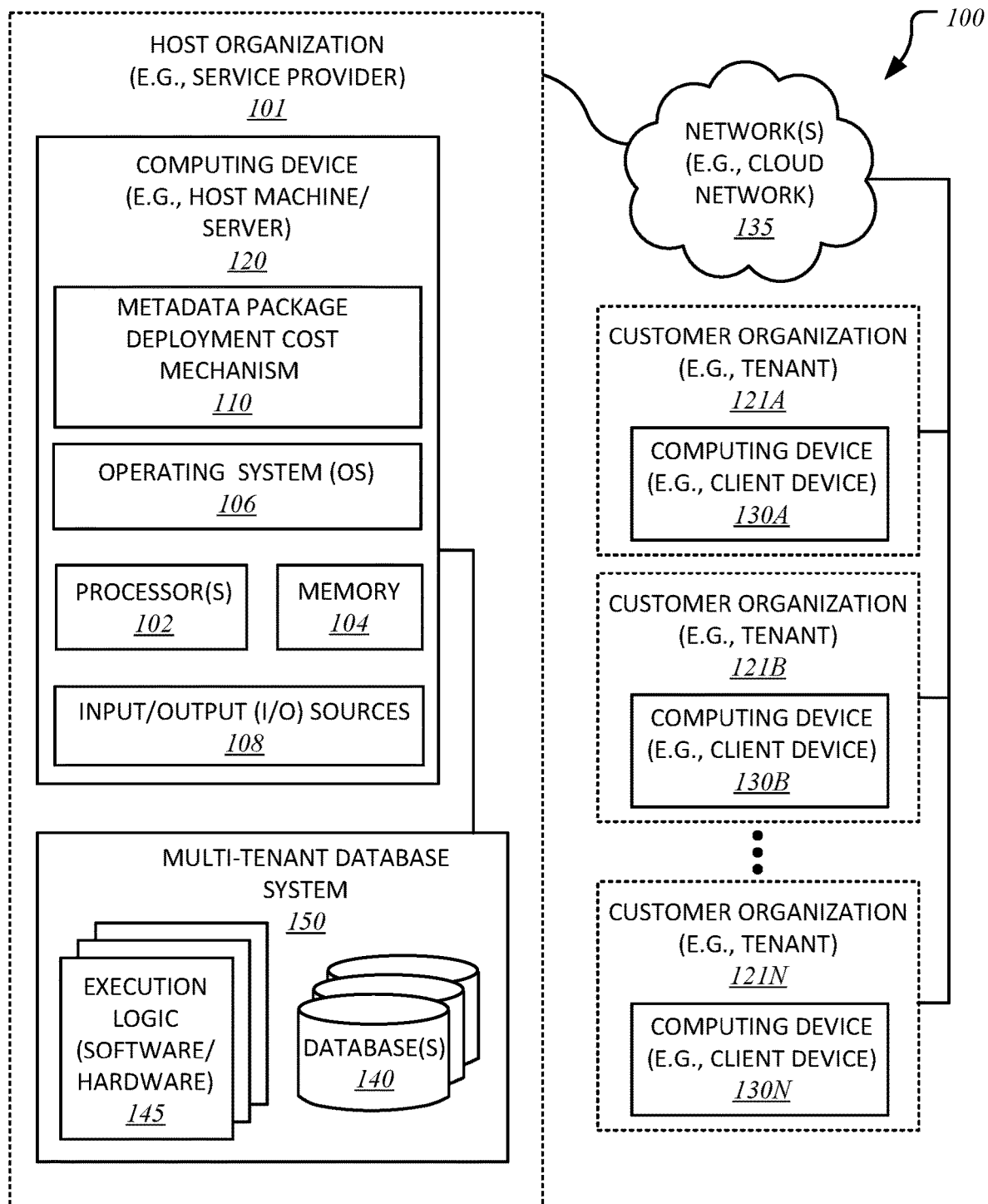
FIG. 1 illustrates a system having a computing device employing a metadata package deployment cost mechanism according to one embodiment.

In the following description, numerous specific details are set forth. However, embodiments of the invention may be practiced without these specific details. In other instances, well-known circuits, structures and techniques have not been shown in detail in order not to obscure the understanding of this description.

Embodiments provide for a novel technique for perform analysis and deployment of metadata packages in database systems such that prior to being deployed, any incoming metadata package deployment requests are analyzed and ascertained for various characteristics associated with such metadata packages, where the characteristics are then compared to or matched against predetermined metadata deployment cost criteria (also referred to as "cost criteria", "costing criteria", or simply "criteria") for smart and efficient deployment of metadata packages.

In one embodiment, a metadata costing engine or mechanism may be hosted by a server computing device to detect and analyze metadata packages upon receiving requests for metadata package deployment. For example, the metadata costing engine (also referred to as "cost engine") may be used to determine, build, and analyze package profiles of the metadata packages, where each package profile includes or is based on a number and type of characteristics (e.g., size, resource requirement, tenant profile/preferences, etc.) associated with its corresponding metadata package. This, in one embodiment, allows for efficient deployment of each metadata package, such as whether it be a standard deployment through default deployment queues or a faster real-time deployment that skips such queues. In one embodiment, criteria may include discrete pieces of logic that may be configured with relevant parameters, changed together, and combined. Further, criteria may be configurable by application server instance to accommodate the different environment and resource usage patterns across multiple instances in various data centers.

Further, in one embodiment, this novel technique allows for modifying a single path or route for deployment into multiple paths that include alternate paths for handling metadata processing and deployment of varying types and sizes of metadata packages. For example, if the costing engine determines that a metadata package has certain preferred characteristics based on criteria matches, then the deployment of the metadata package may be routed through an alternate route, which, in turn, increases performance and avoids latency associated with enqueuing and dequeuing of the relevant deployment request through the time-consuming message queueing system. In some embodiment, deployments are added to or processed through the message queuing system, such as when such deployments are regarded or determined to be better suited in terms of their deployment costs as determined by the costing engine/mechanism.

It is contemplated that embodiments and their implementations are not merely limited to multi-tenant database system ("MTDBS") and can be used in other environments, such as a client-server system, a mobile device, a personal computer ("PC"), a web services environment, etc. However, for the sake of brevity and clarity, throughout this document, embodiments are described with respect to a multi-tenant database system, such as Salesforce.com®, which is to be regarded as an example of an on-demand services environment. Other on-demand services environments include Salesforce® Exact Target Marketing Cloud™.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

A tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

FIG. 1 illustrates a system 100 having a computing device 120 employing a metadata package deployment cost mechanism (also referred to as "cost mechanism" or "costing mechanism") 110 according to one embodiment. As illustrated, in one embodiment, computing device 120, being part of host organization 101 (e.g., service provider, such as Salesforce.com®), represents or includes a server computer acting as a host machine for employing cost mechanism 110 for facilitating smart deployment of metadata packages in a multi-tiered, multi-tenant, on-demand services environment.

It is to be noted that terms like "queue message", "job", "query", "request" or simply "message" may be referenced interchangeably and similarly, terms like "job types", "message types", "query type", and "request type" may be referenced interchangeably throughout this document. It is to be further noted that messages may be associated with one or more message types, which may relate to or be associated with one or more customer organizations, such as customer organizations 121A-121N, where, as aforementioned, throughout this document, "customer organizations" may be referred to as "tenants", "customers", or simply "organizations". An organization, for example, may include or refer to (without limitation) a business (e.g., small business, big business, etc.), a company, a corporation, a non-profit entity, an institution (e.g., educational institution), an agency (e.g., government agency), etc., etc., serving as a customer or client of host organization 101 (also referred to as "service provider" or simply "host"), such as Salesforce.com®, serving as a host of cost mechanism 110.

Similarly, the term "user" may refer to a system user, such as (without limitation) a software/application developer, a system administrator, a database administrator, an information technology professional, a program manager, product manager, etc. The term "user" may further refer to an end-user, such as (without limitation) one or more of customer organizations 121A-N and/or their representatives (e.g., individuals or groups working on behalf of one or more of customer organizations 121A-N), such as a salesperson, a sales manager, a product manager, an accountant, a director, an owner, a president, a system administrator, a computer programmer, an information technology ("IT") representative, etc.

Computing device 120 may include (without limitation) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 130A-130N, etc. Computing device 120 further includes processor(s) 102, memory 104, input/output ("I/O") sources 108, such as touchscreens, touch panels, touch pads, virtual or regular keyboards, virtual or regular mice, etc.

In one embodiment, host organization 101 may further employ a production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated multi-tenant database system 150 includes database(s) 140 to store (without limitation) information, relational tables, datasets, and underlying database records having tenant and user data therein on behalf of customer organizations 121A-N (e.g., tenants of multi-tenant database system 150 or their affiliated users). In alternative embodiments, a client-server computing architecture may be utilized in place of multi-tenant database system 150, or alternatively, a computing grid, or a pool of work servers, or some combination of hosted computing architectures may be utilized to carry out the computational workload and processing that is expected of host organization 101.

The illustrated multi-tenant database system 150 is shown to include one or more of underlying hardware, software, and logic elements 145 that implement, for example, database functionality and a code execution environment within host organization 101. In accordance with one embodiment, multi-tenant database system 150 further implements databases 140 to service database queries and other data interactions with the databases 140. In one embodiment, hardware, software, and logic elements 145 of multi-tenant database system 130 and its other elements, such as a distributed file store, a query interface, etc., may be separate and distinct from customer organizations (121A-121N) which utilize the services provided by host organization 101 by communicably interfacing with host organization 101 via network(s) 135 (e.g., cloud network, the Internet, etc.). In such a way, host organization 101 may implement on-demand services, on-demand database services, cloud computing services, etc., to subscribing customer organizations 121A-121N.

In some embodiments, host organization 101 receives input and other requests from a plurality of customer organizations 121A-N over one or more networks 135; for example, incoming search queries, database queries, application programming interface ("API") requests, interactions with displayed graphical user interfaces and displays at client devices 130A-N, or other inputs may be received from customer organizations 121A-N to be processed against multi-tenant database system 150 as queries via a query interface and stored at a distributed file store, pursuant to which results are then returned to an originator or requestor, such as a user of client devices 130A-N at any of customer organizations 121A-N.

As aforementioned, in one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a web server within host organization 101. Host organization 101 may receive a variety of requests for processing by host organization 101 and its multi-tenant database system 150. For example, incoming requests received at the web server may specify which services from host organization 101 are to be provided, such as query requests, search request, status requests, database transactions, graphical user interface requests and interactions, processing requests to retrieve, update, or store data on behalf of one of customer organizations 121A-N, code execution requests, and so forth. Further, the web-server at host organization 101 may be responsible for receiving requests from various customer organizations 121A-N via network(s) 135 on behalf of the query interface and for providing a web-based interface or other graphical displays to one or more end-user client devices 130A-N or machines originating such data requests.

Further, host organization 101 may implement a request interface via the web server or as a stand-alone interface to receive requests packets or other requests from the client devices 130A-N. The request interface may further support the return of response packets or other replies and responses in an outgoing direction from host organization 101 to one or more client devices 130A-N.

It is to be noted that any references to software codes, data and/or metadata (e.g., Customer Relationship Model ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com Apex™ code, JavaScnpt™, JQuery™, Developerforce™, Visualforce™, Service Cloud Console Integration Toolkit™ ("Integration Toolkit" or "Toolkit"), Platform on a Service™ ("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "code", "software code", "application", "software application", "program", "software program", "package", "software code", "code", and "software package" may be used interchangeably throughout this document. Moreover, terms like "job", "input", "request", and "message" may be used interchangeably throughout this document.

Figure 2:
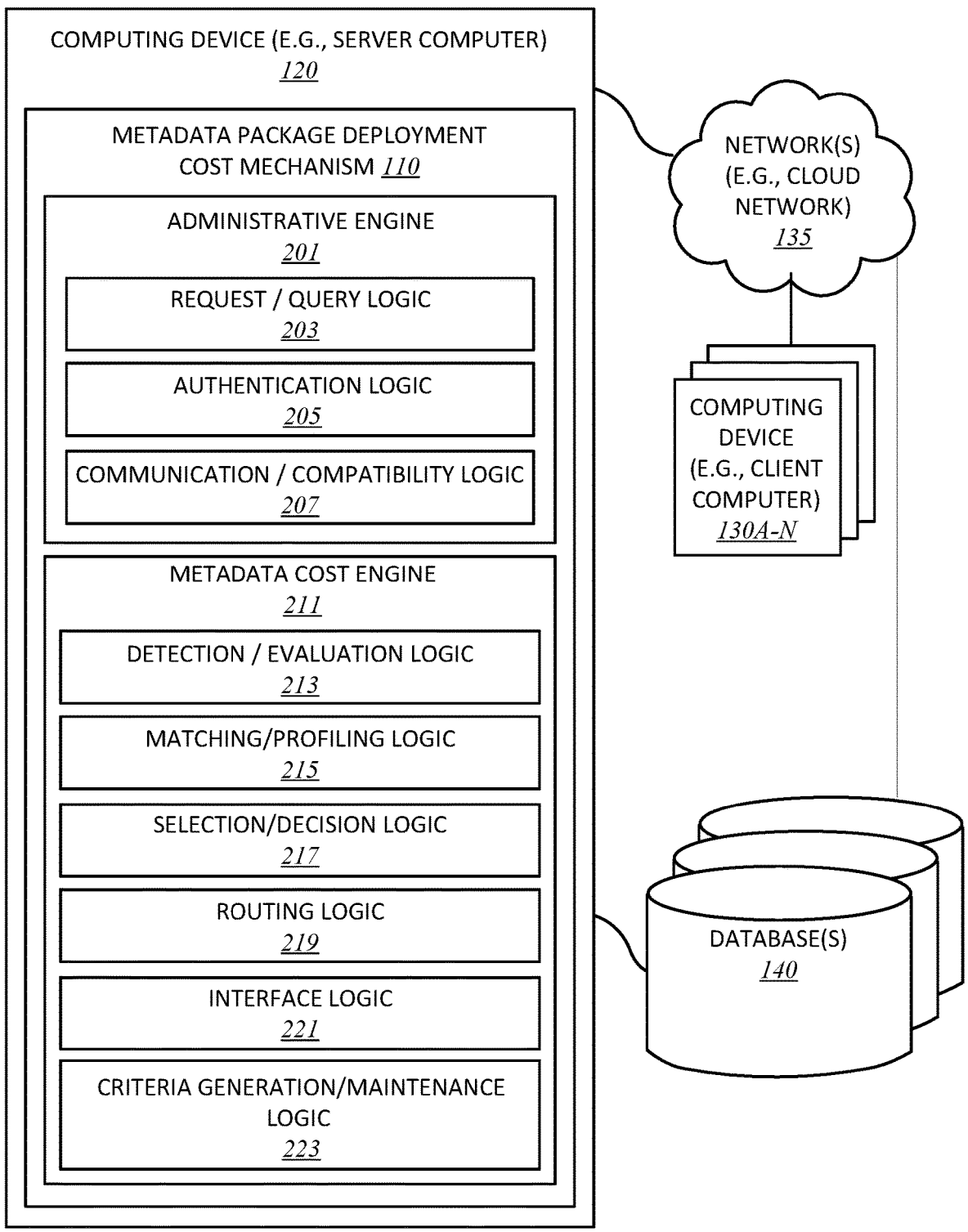
FIG. 2 illustrates a metadata package deployment cost mechanism according to one embodiment.

FIG. 2 illustrates metadata package deployment cost mechanism 110 of FIG. 1 according to one embodiment. In one embodiment, cost mechanism 110 may include any number and type of components, such as administration engine 201 having (without limitation): request/query logic 203; authentication logic 205; and communication/compatibility logic 207. Similarly, cost mechanism 110 may further include metadata cost engine (also referred to as "cost engine" or "costing engine") 211 including (without limitation): detection/evaluation logic 213; matching/profiling logic 215; selection/decision logic 217; routing logic 219; interface logic 221; and criteria generation/maintenance logic 223.

In one embodiment, computing device 120 may serve as a service provider core (e.g., Salesforce.com® core) for hosting and maintaining cost mechanism 110 and be in communication with one or more database(s) 140, one or more client computer(s) 130A-N, over one or more network(s) 135, and any number and type of dedicated nodes. In one embodiment, one or more database(s) 140 may be used to host, hold, or store cost criteria.

Throughout this document, terms like "framework", "mechanism", "engine", "logic", "component", "module", "tool", and "builder" may be referenced interchangeably and include, by way of example, software, hardware, and/or any combination of software and hardware, such as firmware. Further, any use of a particular brand, word, or term, such as "metadata", "metadata package", "deployment", "deployment cost", "characteristics", "criteria", "cost criteria", "costing criteria", "cost engine", "costing engine", "cost rules", "costing rules", "matching", "comparing", "evaluating", "analyzing", "profiling", "selecting", "deciding", "routing", "generating", "maintaining", "routes", "paths", "queues", "queuing", "enqueuing", "dequeuing", "query failure", "latency", "predictability", "time frame", "size", "customization", "testing", "updating", "upgrading", etc., should not be read to limit embodiments to software or devices that carry that label in products or in literature external to this document.

As aforementioned, with respect to FIG. 1, any number and type of requests and/or queries may be received at or submitted to request/query logic 203 for processing. For example, incoming requests may specify which services from computing device 120 are to be provided, such as query requests, search request, status requests, database transactions, graphical user interface requests and interactions, processing requests to retrieve, update, or store data, etc., on behalf of one or more client device(s) 130A-N, code execution requests, and so forth.

In one embodiment, computing device 120 may implement request/query logic 203 to serve as a request/query interface via a web server or as a stand-alone interface to receive requests packets or other requests from the client device(s) 130A-N. The request interface may further support the return of response packets or other replies and responses in an outgoing direction from computing device 120 to one or more client device(s) 130A-N.

Similarly, request/query logic 203 may serve as a query interface to provide additional functionalities to pass queries from, for example, a web service into the multi-tenant database system for execution against database(s) 140 and retrieval of customer data and stored records without the involvement of the multi-tenant database system or for processing search queries via the multi-tenant database system, as well as for the retrieval and processing of data maintained by other available data stores of the host organization's production environment. Further, authentication logic 205 may operate on behalf of the host organization, via computing device 120, to verify, authenticate, and authorize, user credentials associated with users attempting to gain access to the host organization via one or more client device(s) 130A-N.

In one embodiment, computing device 120 may include a server computer which may be further in communication with one or more databases or storage repositories, such as database(s) 140, which may be located locally or remotely over one or more networks, such as network(s) 235 (e.g., cloud network, Internet, proximity network, intranet, Internet of Things ("IoT"), Cloud of Things ("CoT"), etc.). Computing device 120 is further shown to be in communication with any number and type of other computing devices, such as client computing devices) 130A-N, over one or more communication mediums, such as network(s) 140.

As discussed earlier, metadata deployments can suffer from performance issues because conventional techniques provide for handling metadata deployments by enqueuing deployment requests to a default message queue system and subsequently dequeuing the requests for processing. This typically results in delays in metadata deployments due to, for example, long dequeue waiting times caused by the overall system load and/or high resource usage by the metadata message type. Further, for example, these long dequeue times present a particular challenge for smaller metadata deployments for which a quick response may be expected by the user, but is not afforded because, using conventional techniques, there is merely a single path for handling of all deployment requests, such as through enqueuing and dequeuing using the default message queue system. In other words, when using conventional techniques, even those deployments that are smaller in size and may not require a great deal of time or resources for processing take up a significant amount of overall deployment time.

Embodiments provide for a novel technique, as facilitated by cost mechanism 110 and further by cost engine 211, to allow for analysis of requests for metadata deployments and determine whether an alternate processing strategy may be used for optimization of performance and deployment based on various characteristics of metadata packages and their potential deployments. For example, for small deployments having certain characteristics, the standard message queue may be bypassed and the small deployments may be processed immediately and in real-time ("real-time processing"), while any results associated with these deployments are then prepared and made available to be viewed by the user at one or more client computer(s) 130A-N.

As will be further discussed throughout this document, these novel costing and routing techniques using cost criteria provide for smart and efficient deployment of metadata packages. For example, in one embodiment, cost criteria may live in metadata cost engine 211 as part of and supported by detection/evaluation logic 213, matching/profiling logic 215, and selection/decision logic 217. Further, for example, cost engine 211 is shown to include or offer routing logic 219 that may work with or be part of an overall metadata data routing service to allow for alternative routes for processing and deployment of qualified or selected metadata packages. This novel routing logic 219 provides a unique deploy routing service that is capable of using strategy output from analyzers, as facilitated by detection/evaluation logic 213, to invoke a specific deployment processor suited to that strategy as facilitated by selection/decision logic 217.

For example, in one embodiment, a strategy for standard deployment (STANDARD_METADATA_API_DEPLOY) may cause the deployment to be routed to a processor that enqueues a message to a message queue for future processing, while a strategy for real-time deployment (REAL-TIME_METADATA_API_DEPLOY) may cause the deployment to be routed to a processor that facilitates bypassing of the message queue and sends the deployment request directly to a thread pool for immediate and real-time processing, as facilitated by selection/decision logic 217 and routing logic 219. Further, whether a metadata deployment request be selected for standard or real-time deployment may be determined by matching/profiling logic 215 based on metadata package-related information obtained from detection/evaluation logic 213.

In one embodiment, detection/evaluation logic 213 may detect any requests for metadata package deployment and then evaluate the requests for any number and type of characteristics relating to metadata, metadata packages, tenants, etc. For example, characteristics may include, without limitations, one or more of type of metadata, size of metadata, urgencies associated with metadata packages, historical processing and deployment of the same or similar metadata packages, etc., along with any number and type of tenant-related characteristics, such as nature of organization or business, tenant profiles, tenant preferences, tenants' accrued credits for acquiring preferential treatment over other tenants, etc. Any characteristics gathered or evaluated or analyzed by detection/evaluation logic 213 may then be forwarded on to matching/profiling logic 215.

In one embodiment, matching/profiling logic 215 is triggered to match one or more of the characteristics obtained from detection/evaluation logic 213 with cost criteria to determine whether at least one characteristic matches with at least one criterion of cost criteria. For example, matching/profiling logic 215 may continue to perform comparison or matching of the metadata/metadata package/tenant-based characteristics with cost criteria to profile the metadata packages to then recommend an appropriate cost strategy for deployment of each incoming metadata package.

For example, a metadata package may be profiled by matching/profiling logic 215 as small enough that it is expected to consume relatively low amount of resources and thus recommended to be put on a real-time deployment path (as opposed to being sent to queuing). This profiling information and any cost strategy recommendations are forwarded on to selection/decision logic 217 to perform further analysis to select and decide on the final cost strategy for each metadata package. For example, in case of the small metadata package, selection/decision logic 217 may perform a final inspection of rules and criteria from cost criteria in light of available resources, current deployment traffic, content and runtime characteristics of the metadata package, size of the zip file of the metadata package to be uploaded for deployment, certain types of components (such as resource intensive components) of the metadata package, etc., to decide whether the small metadata package qualifies for a particular costing result, such as real-time deployment.

For example, in meeting the rules or requirements of cost criteria at one or more database(s) 140, if the subject metadata package is decided as being small enough and low consumer of resources by selection/decision logic 217, the metadata package may then be selected by selection/decision logic 217 to be processed using the recommended cost-efficient real-time deployment strategy. This decision is communicated on to routing logic 219 to route the metadata package on to a real-time deployment path for real-time deployment of the metadata package.

For example, if the metadata package is regarded as small (SMALL) or very small (XSMALL) and recommended for real-time deployment by selection/decision logic 217 and this decision is communicated on to routing logic 219, routing logic 219 may then return a REALTIME_METADATA_API_DEPLOY command, indicating real-time deployment, for SMALL or XSMALL metadata package to the route the metadata package to a real-time deployment path for immediate real-time deployment bypassing default message queues. If, however, the characteristics associated with the metadata package do not match with cost criteria and consequently, the metadata package fails the real-time deployment qualifications, as decided by selection/decision logic 217, the metadata package may then be regarded as non-XSMALL or non-SMALL or default (DEFAULT) or standard (STANDARD) or large (LARGE), etc., and routed by routing logic 219 to be processed normally by a standard deployment path, such as through standard message queues, by issuing a STANDARD_METADATA_API_DEPLOY command for the unqualified metadata package.

It is contemplated that embodiments are not limited to any particular characteristics or criteria, such as metadata package size, history, resource consumption, etc., and/or tenant profiles, preferences, status, etc. For example, metadata packages are not limited to being qualified or unqualified for real-time deployment simply based on package size or resource consumption. For example, certain metadata packages associated with a tenant regarded as a preferred tenant (such as through payment of extra fees, historical performance, tenant size, elite status, etc.) may enjoy real-time deployment exception over other metadata packages associated with other tenants. For example, a preferred tenant's SMALL metadata package may be routed for real-time deployment, while other tenants may need for their metadata packages to be XSMALL to be qualified for real-time deployment. Similarly, other processing exceptions or strategies may be used and applied for achieving maximizing cost efficiency for metadata package deployments.

As previously described, in one embodiment, criteria generation/maintenance logic 223 may be used to generate, update, and maintain cost criteria at one or more database(s) 140. For example, each time a new criterion is to be generated or an existing criterion is to be modified, criteria generation/maintenance logic 223 may be triggered to ensure cost criteria remains updated and available for one or more components of cost engine 211 to use for comparison and/or matching of criteria with characteristics associated with metadata packages upon receiving deployment request as discussed earlier.

Referring back to routing logic 219, its features and/or operations may be supported by a metadata deploy routing service that may be used to determine the efficient path or route, such as a standard deployment path/route or a real-time deployment path/route, may be taken for a processing and deploying of a metadata package, where this technique may be based on contents of the deploy and result in one or more of a variety of outcomes. For example, for what is regarded as a very small metadata package, a standard deployment path (which may lead to having the metadata package stuck and delayed in queues behind other large metadata packages) is not selected and instead, this very small metadata package is put on a real-time deployment path for real-time and immediate deployment. Similarly, other deployment paths, such as a synchronous deployment path, etc., may be used for deployment and processing and that embodiments are not limited as such.

Further, for example, in case of a standard deployment of a metadata package, routing logic 219 may simply forward a metadata package on to a standard path, leading to standard or default routing and processing of messages, such as Apache® QPID, and ending with a standard deployment of the metadata package. However, when a metadata message qualifies for a real-time deployment, other alternatives are considered, such as routing the metadata package on to a real-time path for real-time processing and deployment bypassing any default message queues.

For example, a very small (XSMALL) metadata package may be regarded as XSMALL for having a relatively small number of components that are to be deployed, where such a number may be treated or regarded as threshold hold number by cost engine 211 for classification and qualification of metadata packages. For example, the XSMALL metadata package may be regarded as such for having, for example, merely 30 configurable components to be deployed in api.xml—MetadataFileRealtimeMaxComponentCount without requiring any tests. If this threshold criterion is met, then this XSMALL metadata package may be deployed in one or more of the following ways: 1) normal deploy; 2) synchronous deploy; 3) XSMALL message deploy; and 4) real-time message deploy In one embodiment, a normal deployment path may be selected by routing logic 219 for a normal deployment or deploy where no configuration is necessitated. This may be regarded as a standard asynchronous deployment, which is capable of immediately returning an identifier that can be used with the check status call to determine the status of the deployment.

Similarly, in one embodiment, a synchronous path may be chosen by routing logic 219 for a synchronous deployment or deploy, where the synchronous path may use a synchronous thread that is capable of returning an identifier once the deployment process is completed. Its results may be immediately available for checking and verifying the deployment's success or failure. If, for some reason, the connection between one or more client computer(s) 130A-N and server computer 1500 is interrupted during processing of a metadata package, an identifier may not be returned and the state of the deployment may be undermined. This synchronous deployment may be used in special cases, such as by special types of tenants (e.g., organizations). Further, synchronous deployment is performed right away and without any overhead, where, in one embodiment, this form of deployment may be configured by setting the following configuration options to true or yes: 1) Metadata Costing Enabled; 2) Metadata Real-Time Deploy Enabled; and 3) Metadata Synchronous Deploy, using a synchronous application programming interface (API).

Now referring to XSMALL message deployment or deploy, a corresponding path, such as XSMALL message deployment path, may be selected by routing logic 219 to rout a metadata package to be processed through XSMALL message deployment. In one embodiment, this may allow small or very small metadata packages to run on their own message type such that they do not have to wait in message queues behind large message types during deployment. Further, these small/very small packages may still be processed by a QPID system; however, they are not throttled in the same way as large packages are throttled. For example, for a normal-sized package, the throttling mechanism may allow for a discrete number of deploys for execution per application server (e.g., 4 by api.xml—DeployCustom-ThrottlingMaxThreadsPerAppServer.

Further, for example, a METADATA_XSMALL_DEPLOY type command may be issued by routing logic 219 without running any risk of overloading the application server as only small number of components (such as equal to or lower than the threshold number of components) are deployed without running any tests which, in turn, allows for automatic throttling by the system, such as QPID system, and more threads to run dictated by the number of real application clusters (RAC) nodes in a pod times the number of application servers.

This XSMALL deploy may be enabled by setting Metadata Real-Time Deploy Enabled to false, while both of Metadata Costing Enabled and Metadata XSMALL Message Type are set to true. It is contemplated that embodiments are not limited to any particular size or even characteristic. For example, XSMALL may be substituted for any number and type of other characteristics and/or criteria, such as SMALL, DEFAULT, MEDIUM, LAGE, XLARGE, PREFERRED TENANT, PRIORITY PACKAGE, SMALL AND PREFERRED, and/or the like.

Similarly, real-time message deployment or deploy may be used to allow for very small and small metadata packages to be processed and deployed without any tests to avoid any additional overhead of going through message queues; nevertheless, act in an asynchronous manner by using a thread pool. As with other deploys, routing logic 219 may route a metadata package on to a real-time deployment path for real-time deployment. Further, an identifier may be returned immediately to the caller and the deployment status may be checked as normal to determine whether the deployment is completed or not. For example, should an error occur during the deploy such that the deploy process takes too long or the thread pool is already busy, the deployment may be re-routed by routing logic 219 to message queues, such as QPID, for normal processing. For example, it may be routed to a standard message type or XSMALL type and is configured by answering true or yes to one or more of the following: 1) Metadata Costing Enabled; 2) Metadata Real-Time Deploy Enabled; 3) Metadata XSMALL Message Type (answer false or no, if routing to a normal message type is desired); 4) Metadata Synchronous Deploy; and 5) Metadata Real-time Requeue Instead of Fail (answer false or no, if immediate failure is desired).

It is contemplated that various features and embodiments, such as enabling real-time deployment, etc., may be turned on or off, as desired or necessitated, by using any number and type of configuration and/or tuning files, such as allowing a production to be modified and maintained in a controlled manner with, for example, an audit train in real-time without having to restart servers or having a patch release. Similarly, cost engine 211 may support features to allow for requests from special types of tenants/organizations to be sent to the message queue with their own message type.

Moreover, in one embodiment, one or more commands may be used to enable or disable any number and type of components of deployment mechanism 110, such as enabling or disabling cost engine 211 for allowing a metadata package to be analyzed and costed to that a proper route for it may be determined. For example, if cost engine 211 is disabled or set to false, the deployment may act normally, while when cost engine 211 is enable or set to true, the various processes discuss above may be performed by one or more of its component to strategize and determine the most appropriate path, such as standard path, real-time path, etc., for each metadata package available for deployment. Similarly, other components, such as real-time deploy path, real-time requeue path, synchronous deploy path, normal deploy path, etc., may be enabled or disabled or modified to act differently, as desired or necessitated.

Further, in one embodiment, interface logic 221 may be used to facilitate interfacing between various components of deployment mechanism 110 as well as with other components and/or devices, such as between matching/profiling logic 215 and one or more database(s) 140 so that matching/profiling logic 215 my access cost criteria for matching and/or profiling purpose. Similarly, in one embodiment, interface logic 221 may be used to facilitate and support user interface(s) at one or more computing device(s) 130A-N so that any queries associated with processing and deployment of metadata packages may be placed, while its results, may be accessed and/or viewed by users through such user interface(s) at one or more computing device(s) 130A-N. It is contemplated that the one or more interfaces are not limited to any particular number or type of interfaces such that an interface may include (without limitations) any one or more of a user interface (e.g., Web browser, Graphical User Interface (GUI), software application-based interface, etc.), an application programming interface (API), a Representational State Transfer (REST) or RESTful API, and/or the like.

It is contemplated that a tenant may include an organization of any size or type, such as a business, a company, a corporation, a government agency, a philanthropic or non-profit entity, an educational institution, etc., having single or multiple departments (e.g., accounting, marketing, legal, etc.), single or multiple layers of authority (e.g., C-level positions, directors, managers, receptionists, etc.), single or multiple types of businesses or sub-organizations (e.g., sodas, snacks, restaurants, sponsorships, charitable foundation, services, skills, time etc.) and/or the like.

Communication/compatibility logic 207 may facilitate the ability to dynamically communicate and stay configured with any number and type of software/application developing tools, models, data processing servers, database platforms and architectures, programming languages and their corresponding platforms, etc., while ensuring compatibility with changing technologies, parameters, protocols, standards, etc.

It is contemplated that any number and type of components may be added to and/or removed from deployment mechanism 110 to facilitate various embodiments including adding, removing, and/or enhancing certain features. It is contemplated that embodiments are not limited to any particular technology, topology, system, architecture, and/or standard and are dynamic enough to adopt and adapt to any future changes.

Figure 3:
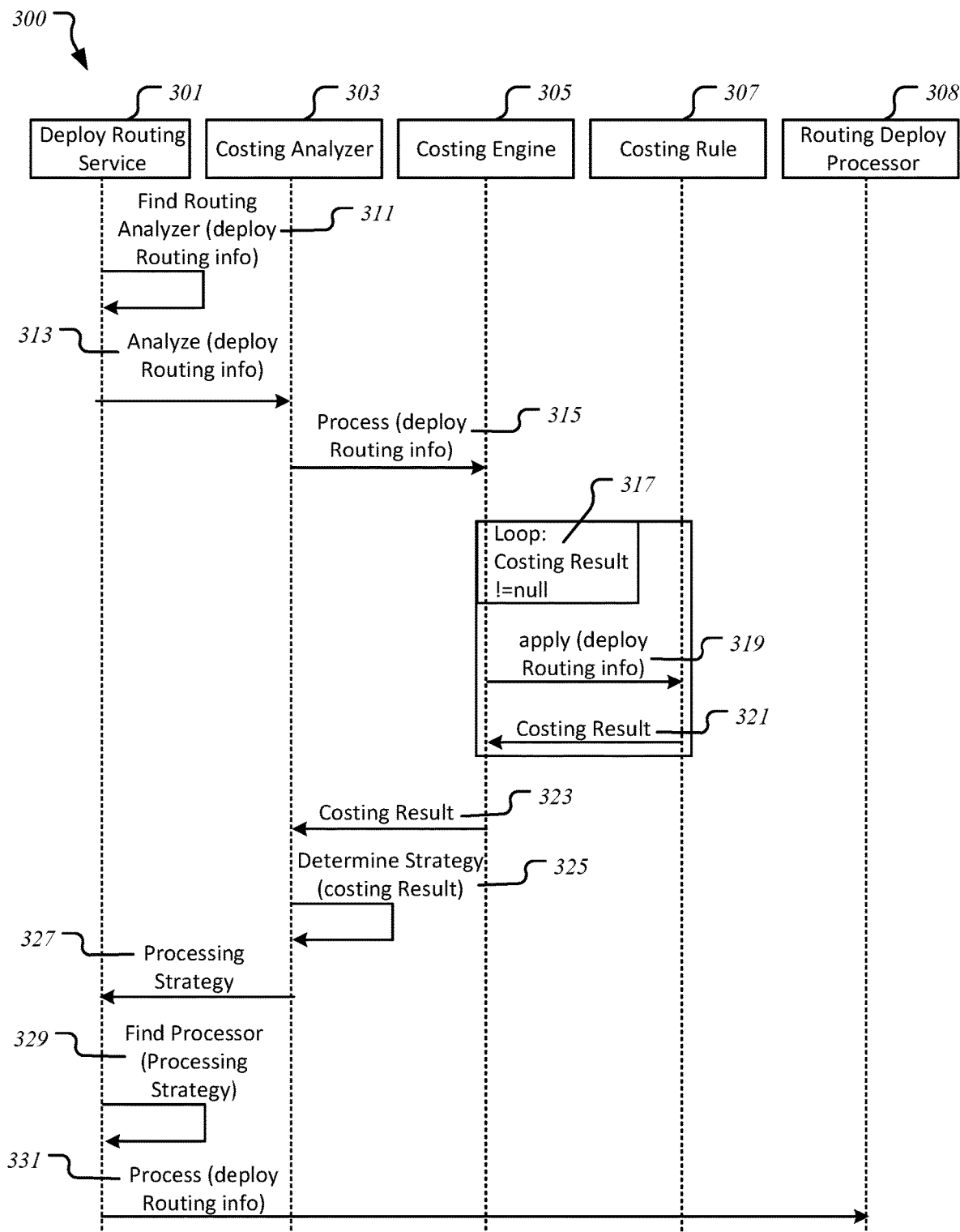
FIG. 3 illustrates a transaction sequence for facilitating cost-efficient deployment of metadata packages according to one embodiment.

FIG. 3 illustrates a transaction sequence 300 for facilitating cost-efficient deployment of metadata packages according to one embodiment. Transaction sequence 300 may be performed by processing logic that may comprise hardware (e.g., circuitry, dedicated logic, programmable logic, etc.), software (such as instructions run on a processing device), or a combination thereof. In one embodiment, transaction sequence 300 may be performed or facilitated by one or more components of cost mechanism 110 of FIGS. 1-2. The processes of transaction sequence 300 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-2 may not be repeated or discussed hereafter.

As illustrated, in one embodiment, deploy routing service 301 to find routing analyzer (to deploy routing information) at 311, as represented or facilitated by routing logic 219 and/or detection/evaluation logic 213 of FIG. 2, where detection/evaluation logic 213 may be used to detect and observe deploy routing information relating to metadata packages. In one embodiment, cost analyzer 303, as represented or facilitated by detection/evaluation logic 213 and/or matching/profiling logic 215 of FIG. 2, analyzes deploy routing information at 313 and subsequently, at 315, processes and communicates the deploy routing information with costing engine 305 as represented or facilitated by cost engine 211 of FIG. 2.

In one embodiment, costing engine 305, as facilitated by cost engine 211 of FIG. 2, and costing rule (also referred to as "cost rule") 307, using cost criteria, to perform a loop starting with costing result being null at 317, applying deploy routing info at 319, and communicating back costing result 321. At 323, costing engine 305 is further to communicate costing results to costing analyzer 303 at 323, while costing analyzing 303 determines a processing strategy for deployment of metadata packages as facilitated by matching/profiling logic 215 and selection/decision logic 217 of FIG. 2. In one embodiment, at 327, the processing strategy is communicated on to deploy routing service 301, where, at 329, routing deploy processor 309 is detected and found to act according to the processing strategy. At 331, relevant processing/routing information is communicated over to routing deploy processor 309, as represented or facilitated by routing logic 219 to pursue an appropriate deployment path, such as a real-time path, a standard path, etc.

Figure 4:
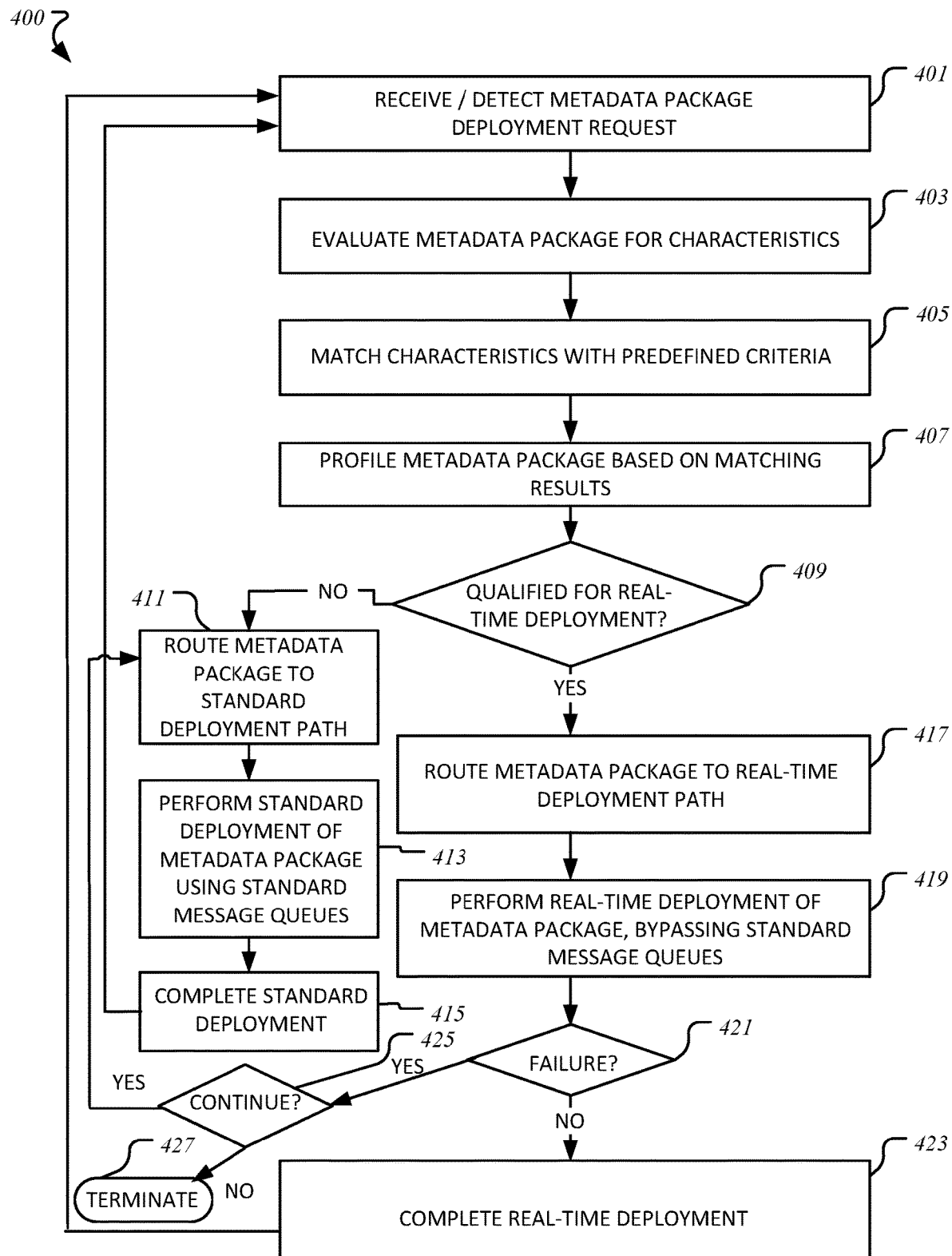
FIG. 4 illustrates a method for facilitating cost-efficient deployment of metadata packages according to one embodiment.

FIG. 4 illustrates a method 400 for facilitating cost-efficient deployment of metadata packages according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed or facilitated by one or more components of cost mechanism 110 of FIGS. 1-3. The processes of method 400 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-3 may not be repeated or discussed hereafter.

Method 400 begins at block 401 with receiving or detecting of a metadata package deployment request, where the metadata package associated with the request is evaluated for characteristics at block 403. In one embodiment, at block 405, the characteristics are matched with or compared to predefined cost criteria at one or more databases. At block 407, using the matching results, the metadata package is profiled for deployment strategy.

At block 409, a determination is made as to whether metadata package is qualified for real-time deployment. If not, at block 411, the metadata package is routed on to a standard path for standard deployment. At block 413, a standard deployment is performed on the metadata package using standard message queues and, at block 415, the deployment is completed and method 400 may repeat with block 401.

Referring back to block 409, if the metadata package is qualified for real-time deployment, at block 417, the metadata package is routed on to a real-time path for real-time deployment. At block 419, a real-time deployment of the metadata package is performed bypassing the standard message queues. In one embodiment, if there are any problems with the real-time deployment, at block 421, a determination is made as to whether the real-time deployment as failed or is likely to fail. If there is no failure or that it is not expected, the real-time deployment is completed at block 423 and method 400 may repeat with block 401.

If, however, there is a failure or that it is expected, another determination is made at block 425 as to whether at least the standard deployment may be performed, such as when the process might be considered a failure with regard to real-time deployment for being very slow, etc., but not with regard to standard deployment. If such is the case, the method 400 may continue at 411 with routing of the metadata package for standard deployment. If, however, there is another sort of problem with the process, such as lack of sufficient data to complete the deployment whether it be standard or real-time, then method 400 is simply terminated at block 427.

Figure 5:
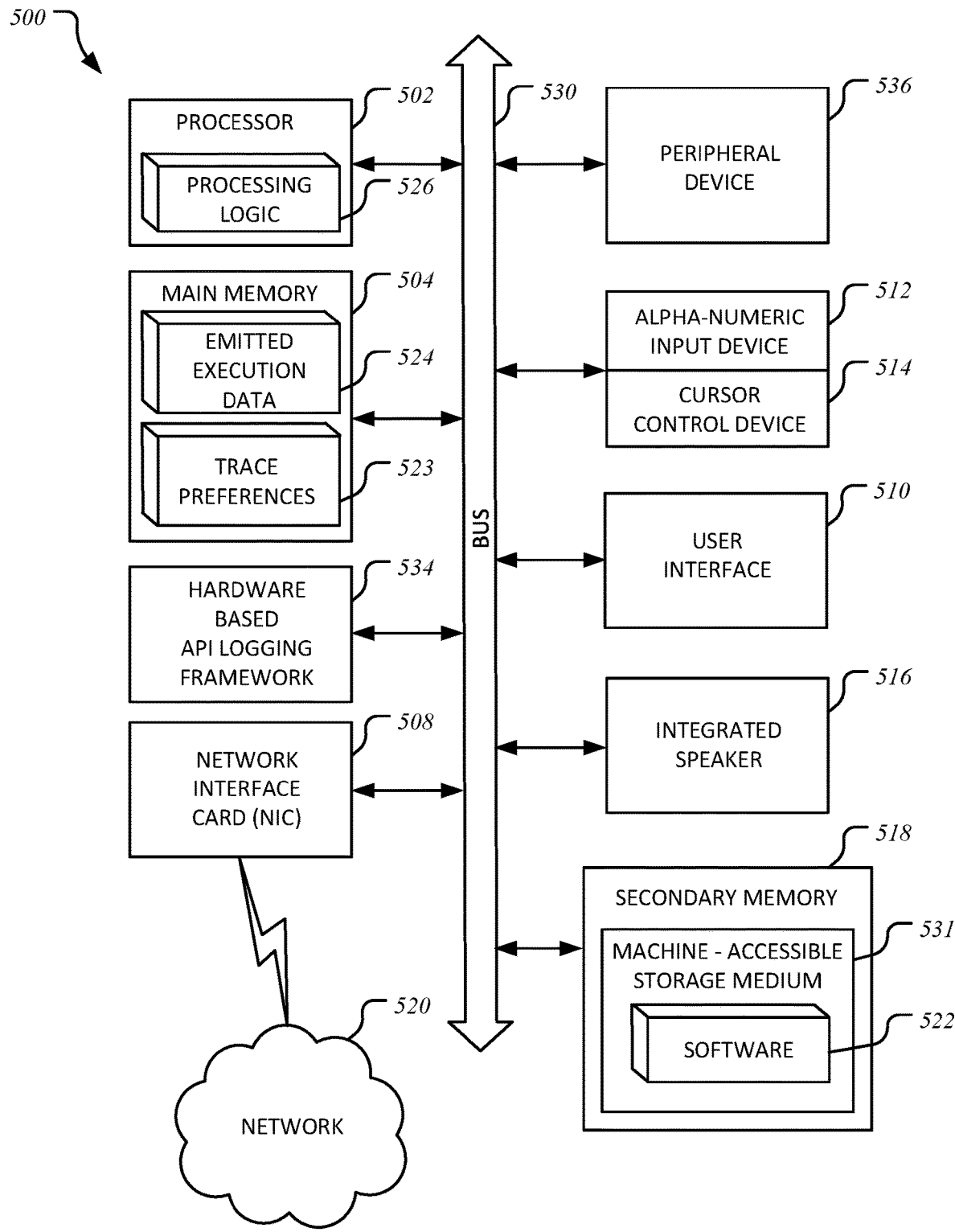
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing devices 120, 130A-N of FIG. 1. In alternative embodiments, the machine may be connected (e.g., networked) to other machines in a network (such as host machine 120 connected with client machines 130A-N over network(s) 135 of FIG. 1), such as a cloud-based network, Internet of Things (IoT) or Cloud of Things (CoT), a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of query mechanism 110 as described with reference to FIG. 1 and other Figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of query mechanism 110 as described with reference to FIG. 1, respectively, and other figures discussed herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
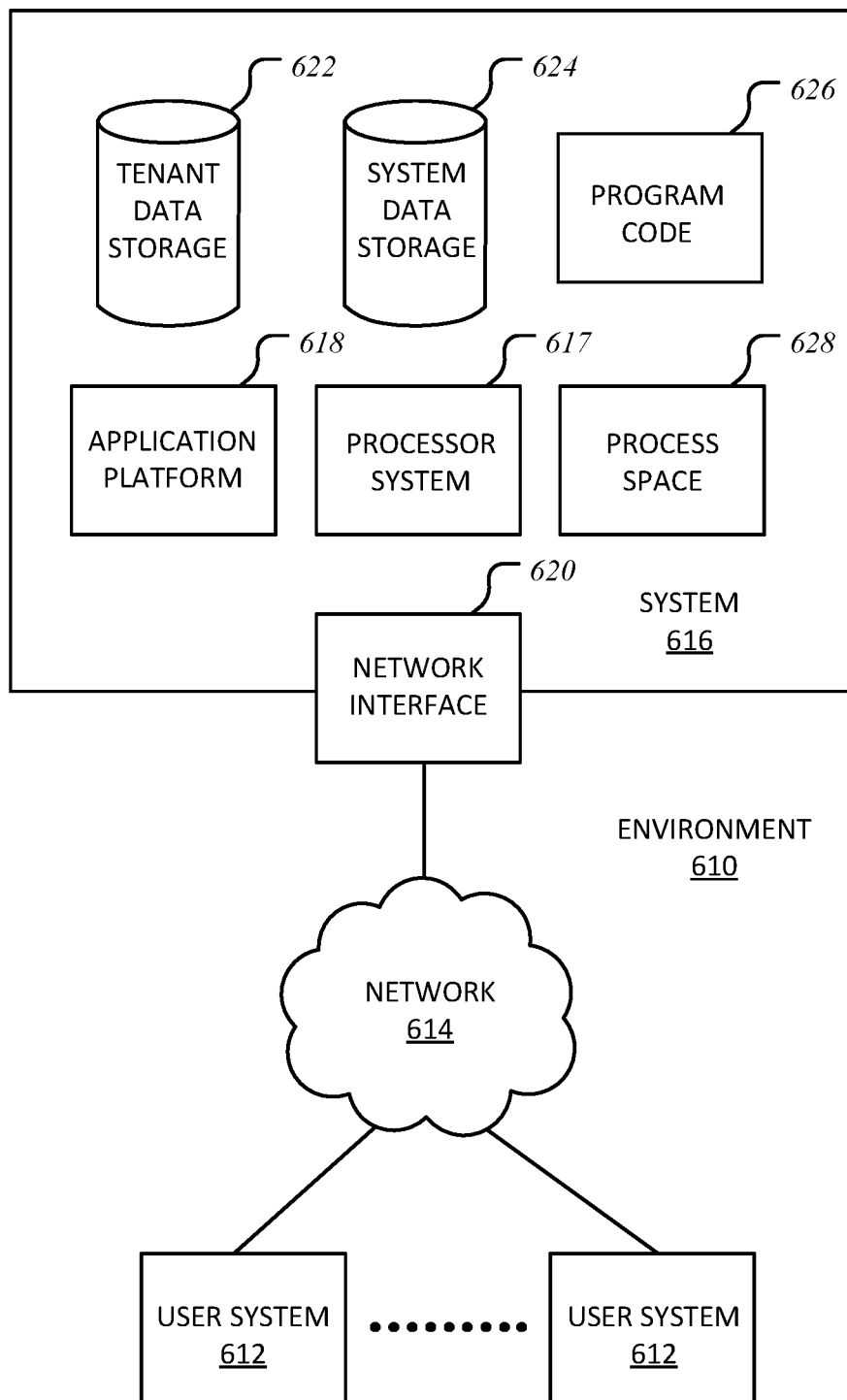
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a workstation, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third-party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load-sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third-party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database-indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline back-ups or other redundancies, etc., and might include a distributed database or storage network and associated processing intelligence.

Figure 7:
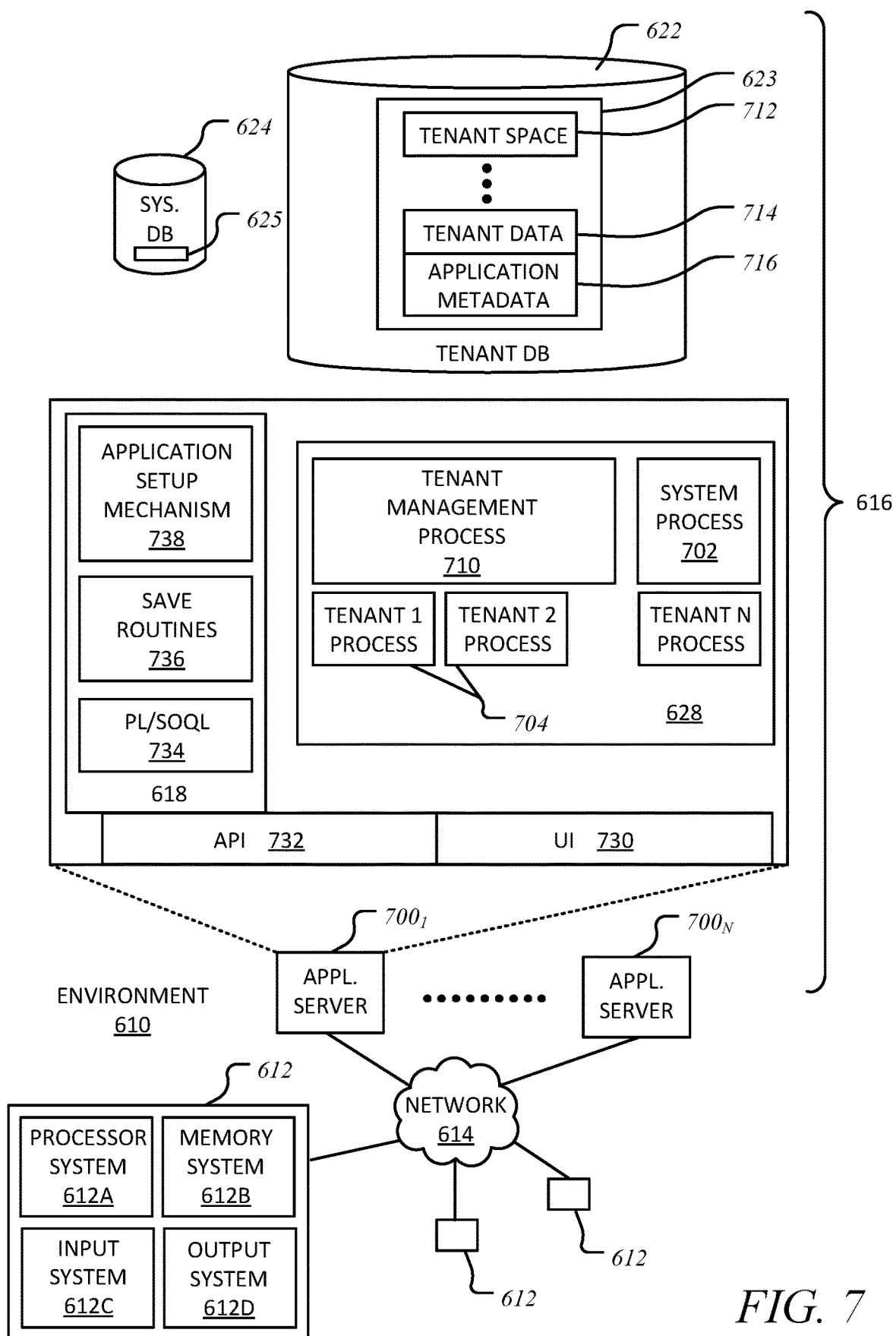
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items may be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A method comprising:
   analyzing, by a metadata server, characteristics of a metadata package awaiting deployment, wherein analyzing includes matching the characteristics with predefined criteria associated with deployment of metadata packages;
   generating, by the metadata server, a profile specific to the metadata package based on results obtained from matching of the characteristics with the predefined criteria, wherein the profile offers routing and deployment guidelines associated with the metadata package, wherein the characteristics include one or more of a deployment history of the metadata package and an indication of an amount of resources expected to be consumed by the metadata package, wherein the indication is based on a size of the metadata package, urgency associated with the metadata package, and credits or preferences associated with the metadata package; and
   routing, by the metadata server, the metadata package for deployment based on the profile, wherein the metadata package is deployed in real-time when at least one characteristic satisfies at least one predefined criterion.

2. The method of claim 1, wherein the metadata package is routed for the standard deployment if the characteristics fail to satisfy the criteria, wherein the standard deployment is achieved through a standard path, while the real-time deployment is achieved through a real-time path.

3. The method of claim 1, further comprising selecting the real-time deployment or the standard deployment based on the size of the metadata package such that the metadata package of a small size is selected for the real-time deployment, wherein the metadata package of a non-small size is selected for the standard deployment.

4. The method of claim 3, wherein the small size corresponds to a threshold size as defined by at least one of the criteria maintained at one or more databases.

5. A database system comprising:
   a metadata server having a processing device coupled to memory having stored thereon instructions, the processing device to execute the instructions to facilitate operations comprising:
   analyzing characteristics of a metadata package awaiting deployment, wherein analyzing includes matching the characteristics with predefined criteria associated with deployment of metadata packages;
   generating, by the metadata server device, a profile specific to the metadata package based on results obtained from matching of the characteristics with the predefined criteria, wherein the profile offers routing and deployment guidelines associated with the metadata package, wherein the characteristics include one or more of a deployment history of the metadata package and an indication of an amount of resources expected to be consumed by the metadata package, wherein the indication is based on a size of the metadata package, urgency associated with the metadata package, and credits or preferences associated with the metadata package; and
   routing the metadata package for deployment based on the profile, wherein the metadata package is deployed in real-time when at least one characteristic satisfies at least one predefined criterion.

6. The database system of claim 5, wherein the metadata package is routed for the standard deployment if the characteristics fail to satisfy the criteria, wherein the standard deployment is achieved through a standard path, while the real-time deployment is achieved through a real-time path.

7. The database system of claim 5, wherein the operations further comprise selecting the real-time deployment or the standard deployment based on the size of the metadata package such that the metadata package of a small size is selected for the real-time deployment, wherein the metadata package of a non-small size is selected for the standard deployment.

8. The database system of claim 7, wherein the small size corresponds to a threshold size as defined by at least one of the criteria maintained at one or more databases.

9. A non-transitory computer-readable medium having stored thereon instructions which, when executed, cause a computing device to perform operations comprising:
   analyzing characteristics of a metadata package awaiting deployment, wherein analyzing includes matching the characteristics with predefined criteria associated with deployment of metadata packages;
   generating a profile specific to the metadata package based on results obtained from matching of the characteristics with the predefined criteria, wherein the profile offers routing and deployment guidelines associated with the metadata package, wherein the characteristics include one or more of a deployment history of the metadata package and an indication of an amount of resources expected to be consumed by the metadata package, wherein the indication is based on a size of the metadata package, urgency associated with the metadata package, and credits or preferences associated with the metadata package; and routing the metadata package for deployment based on the profile, wherein the metadata package is deployed in real-time when at least one characteristic satisfies at least one predefined criterion.

10. The non-transitory computer-readable medium of claim 9, wherein the metadata package is routed for the standard deployment if the characteristics fail to satisfy the criteria, wherein the standard deployment is achieved through a standard path, while the real-time deployment is achieved through a real-time path.

11. The non-transitory computer-readable medium of claim 9, wherein the operations further comprise selecting the real-time deployment or the standard deployment based on the size of the metadata package such that the metadata package of a small size is selected for the real-time deployment, wherein the metadata package of a non-small size is selected for the standard deployment.

12. The non-transitory computer-readable medium of claim 11, wherein the small size corresponds to a threshold size as defined by at least one of the criteria maintained at one or more databases.

* * * * *